United States Patent [19]

Chase et al.

[11] 4,282,174

[45] Aug. 4, 1981

[54] METHOD OF MAKING AN ARTICLE OF BONDED METAL PARTICLES

[76] Inventors: Barry J. Chase, 22 Orchard Ave., Sonning Common, Reading, Berkshire; Roy W. E. Rushforth, 77 Nightingale Rd., Woodley, Reading, Berkshire; Gordon J. Selman, 59 Peppard Rd., Sonning Common, Reading, Berkshire, all of England

[21] Appl. No.: 120,889

[22] Filed: Feb. 12, 1980

[30] Foreign Application Priority Data

May 13, 1977 [GB] United Kingdom ................ 2027/77

[51] Int. Cl.$^3$ .............................................. B29C 3/00
[52] U.S. Cl. ..................................... 264/111; 264/122
[58] Field of Search .............................. 264/111, 122

[56] References Cited

U.S. PATENT DOCUMENTS

| | | | |
|---|---|---|---|
| 3,678,145 | 7/1972 | Boes | 264/122 |
| 3,708,387 | 1/1973 | Turner et al. | 161/168 |
| 3,923,946 | 12/1975 | Meyer | 264/111 |

Primary Examiner—Donald E. Czaja
Assistant Examiner—James R. Hall
Attorney, Agent, or Firm—Cushman, Darby & Cushman

[57] ABSTRACT

A process for producing metallic articles comprises forming a mixture of metallic particles of platinum group metals, gold or silver, and particles of a thermoplastic material, placing the mixture in a mold and molding the mixture under pressure and at an elevated temperature. The metallic particles comprise at least 92.5% by weight of the article and have a size ranging from ½ to 50 microns. The thermoplastic polymeric material has a minimum dimension of ½ micron.

11 Claims, No Drawings

METHOD OF MAKING AN ARTICLE OF BONDED METAL PARTICLES

This invention relates to a process for producing metallic articles. In particular, the invention provides a novel method for the fabrication of metallic articles or bodies, especially for such articles as items of jewelry or other relatively small items which are required to be made to a high standard of dimensional accuracy and/or detail.

One hitherto commonly-used technique for producing such metallic articles has been investment casting, otherwise known as the "lost-wax" process. The main disadvantage of this process, which is very well known in the art, is of course that a separate casting mold is required for each individual article products.

It is an object of the present invention to overcome this disadvantage. Other objects and advantages of the invention will become clear from the description which follows.

According to one aspect of the invention, a process for producing a metallic article comprises forming a mixture of metallic particles and plastic particles, placing said mixture in a mold and molding the mixture under pressure and at an elevated temperature and removing from said mold said metallic article.

The metallic particles may comprise one or more metals of the platinum group, gold, silver and/or the base metals. Where more than one metal is present, said metals may constitute an alloy or, alternatively, said particles may comprise a mixture of particles of one metal or alloy with particles of one or more other metals or alloys.

The plastic particles may comprise either a thermosetting or a thermoplastic polymeric material. For example, suitable thermoplastic homo polymers include polyethylene, polypropylene, polystyrene and polymethylmethacrylate and suitable copolymers include, for example, polymethylmethacrylate/methacrylic acid. Suitable thermosetting polymers include, for example urea/formaldehyde resins, phenol/formaldehyde resins, melamines and epoxy resins. Nylon may also be used.

The particles both of metallic material and plastic material may be in the form of powders, granules, flakes, shavings, turnings and so on. The metallic particles are typically in the form of powder, the individual grains of which may be either spheroidal or irregularly-shaped, and the plastic particles are typically in the form of shavings.

The particle size range for the metallic particles is typically $\frac{1}{2}$ to 50 microns and plastic particles having a minimum dimension (e.g. the thickness of the flakes, turnings, shavings, etc.,) of $\frac{1}{2}$ micron is preferred. Where the plastic material is in powder or granular form, the size range may be the same as that used for the metallic particles.

The molding pressure may be up to 20 tons in $^{-2}$ and the elevated temperature is variable depending on the plastic material used. For most materials, however, a temperature within the range 100°-250° C. will suffice.

Optionally, and particularly when a tarnishable metal or alloy is used, for example silver, a tarnish inhibiting composition is included in the mixture of metallic and plastic particles. Such compositions may comprise either known tarnish-inhibiting compounds such as cyclohexylamine or a derivative thereof or proprietary tarnish-inhibiting formulations such as "silver Safe".

We have found that the process of the invention is excellent for the fabrication of "cheap" items of jewelry, such as medallions, for example, which are required by the manufacturer to be capable of being produced quickly and in large numbers to satisfy a popular demand and are required by the customer to have a pleasing appearance but little intrinsic value. Such items have commonly been made from sterling silver—that is to say, an alloy containing not less than 92.5% by weight silver, balance copper—which has necessitated the use of the investment casting process. Using the process of the invention, however, items may be made which contain an equivalent weight percentage of silver, balance plastic material, and which are visually indistinguishable from their sterling silver counterparts.

According to a second aspect of the invention, therefore, we provide an article consisting essentially of a metallic/plastic composite and produced according to the first aspect of the invention.

A feature of such articles is that they are somewhat lighter in weight than their investment cast counterparts. In the case of an article containing rather more than the 7.5% by weight of plastic material contained in the sterling silver counterpart, and particularly where the metal present is very heavy, for example an alloy containing a major proportion of tungsten, the difference in weight is significant and this may constitute an advantage of the invention.

A further advantage is that articles according to the invention may readily be glued together using either a solvent or solvent blend, for example comprising chloroform, or a proprietary adhesive. This avoids the need for a delicate brazing or soldering operation using solders which need to be carefully color-matched to and otherwise compatible with investment cast articles. Thus objects may be constructed from two or more articles according to the invention, or an article may be, say, mounted on a polymethylmethacrylate base for display purposes.

Yet a further advantage of the invention is that a pigmentary material may be included in the mixture of metallic and plastic particles, thus enabling various decorative effects to be achieved. Alternatively, the plastic material may itself be pigmented.

The invention will now be described with reference to the following examples using different polymers for the plastic particles.

1. Polyethylene (LDPE)

Low density polyethylene powder was obtained by refluxing xylene and polyethylene granules (obtained from Imperial Chemical Industries Ltd., England). The resultant mix was allowed to cool and set. The gel was dispersed in isopropanol and the resultant powder was allowed to settle. The LDPE powder was washed with isopropanol and dried. Samples of flake silver FS2 (obtained from Johnson Matthey Chemicals, Ltd., Rouston, England) and LDPE powder in the ratio 95:5 by weight were mixed by hand and pressed into discs in a 13 mm diameter mold at temperatures ranging from 100° C. and loads of $\frac{1}{2}$ and 1 ton. The resulting discs had little strength and possessed a dull surface finish.

2. Polystyrene (PS)

The PS was in the form of fairly coarse powder and samples were hand-mixed with flake silver FS2 to give a silver loading of 92.5% by weight. The samples were pressed into discs at temperatures ranging from 180° C.–225° C. under loads ranging from ½ to 2 tons. The resulting discs had a dull surface appearance but a reasonable strength.

3. Polymethyl Methacrylate (PMMA)

PMMA was available in both high and low molecular weight forms and was obtained from Bristol Drug House. Samples of silver and polymer were mixed at a 92.5% silver loading and were pressed at temperatures ranging from 25° C. to 250° C., at loads of ½ to 3 tons. At higher temperatures (215°) the polymer tended to degrade and discolor. Generally, the discs had a metallic surface finish but without a good dispersion of polymer within the matrix. This lack of dispersion enabled the discs to be easily fractured, although the finished appearance was generally acceptable.

In order to induce more strength into the pressed discs it was considered that polymer strands, rather than powder, would be more effective. PMMA shavings were obtained from 'Perspex' sheeting and were ground in a mortar. Samples of ground shavings were hand mixed with 92.5% silver flake FS2 and were hot-pressed in the 13 mm mold at temperatures from 100° C. to 215° C. and under loads of ½ to 3 tons. Further samples were pressed in a 25 mm diameter mold at 180° C. under loads ranging from 2.5 to 10 tons. In all cases increased disc strength was achieved, the best result in terms of strength and appearance being achieved by pressing at 180° C. under a 10 ton loading using the 25 mm diameter mold.

4. Nylon

Samples of nylon 66 powder were mixed with 92.5% FS2 flake silver and were hot-pressed in a 13 mm diameter mold at temperatures ranging from 150° C. to 220° C. under loads of 1 to 10 tons. In all cases the surface finish was poor but reasonable disc strength was achieved at 220° C. under a 5 ton load.

Although the invention has been described principally with reference to fabricating articles such as items of jewelry, comprising silver, it should be evident that the method can readily be adapted to the fabrication of a wide range of articles using virtually any metal or alloy in association with a suitable plastic material.

What we claim is:

1. A process for producing a metallic article comprising forming a mixture of metallic particles selected from the group consisting of platinum group metals, gold and silver and particles of a thermoplastic material, placing said mixture in a mold and molding the mixture under pressure and at elevated temperature, and removing from said mold said metallic article, the metallic particles comprising at least 92.5% by weight of the article and having a size falling within the range ½ to 50 microns, and the thermoplastic polymeric material having a minimum dimension of ½ micron.

2. A process according to claim 1 wherein the mixture of particles includes particles of two or more of said metals or alloys thereof.

3. A process according to claim 1 wherein the metallic or plastic particles are in the form of powder, granules, flakes, shavings or turnings.

4. A process according to claim 3 wherein the metallic particles are in powder form and the plastic particles are in the form of shavings.

5. A process according to claim 1 wherein the elevated temperature is within the range 100° to 250° C.

6. A process according to claim 1 wherein the mixture includes a tarnishing inhibiting composition to inhibit tarnishing of the metal component.

7. A process according to claim 1 wherein the article contains not less than 92.5 wt. % silver.

8. A process according to claim 1 wherein the plastic particles are made from a member of the group consisting of polyethylene, polystyrene, polymethyl methacrylate and nylon.

9. A metallic article when made in accordance with the process of claim 1.

10. A process for producing a metallic article comprising forming a mixture of metallic particles selected from the group consisting of platinum group metals, gold and silver, and particles of a thermoplastic material, placing said mixture in a mold and molding the mixture under pressure and at an elevated temperature and removing from said mold said metallic article, the metallic particles having a size falling within the range ½ to 50 microns.

11. A process for producing a metallic article comprising forming a mixture of metallic particles selected from the group consisting of platinum group metals, gold and silver, particles of a thermoplastic material and a tarnish inhibiting amount of a tarnish inhibiting agent, placing said mixture in a mold and molding the mixture under pressure and at a temperature ranging from 100 to 250° C. and removing from said mold said metallic article, the metallic particles comprising at least 92.5% by weight of the article and having a size falling within the range ½ to 50 microns, and the thermoplastic particles having a minimum dimension of ½ micron.

* * * * *

UNITED STATES PATENT AND TRADEMARK OFFICE
CERTIFICATE OF CORRECTION

PATENT NO. : 4,282,174
DATED : August 4, 1981
INVENTOR(S) : Barry J. Chase; Roy W.E. Rushforth; Gordon L. Selman It is certified that error appears in the above-identified patent and that said Letters Patent are hereby corrected as shown below:

Column 1, before first paragraph, insert:

--This is a continuation of application Serial No. 904,931, filed May 10, 1978, now abandoned.--

On face of patent, add:

--Related U.S. Application Data
[63] Continuation of Serial No. 904,931, May 10, 1978, abandoned.--

Item [30] correct United Kingdom No. to read --20227/77--

Item [76] change "Gordon J. Selman" to --Gordon L. Selman--

Signed and Sealed this

Twenty-third Day of February 1982

[SEAL]

*Attest:*

*Attesting Officer*

GERALD J. MOSSINGHOFF

*Commissioner of Patents and Trademarks*